J. L. SIMANTEL.
ANIMAL CATCHER.
APPLICATION FILED MAY 22, 1919.
1,344,828.
Patented June 29, 1920.
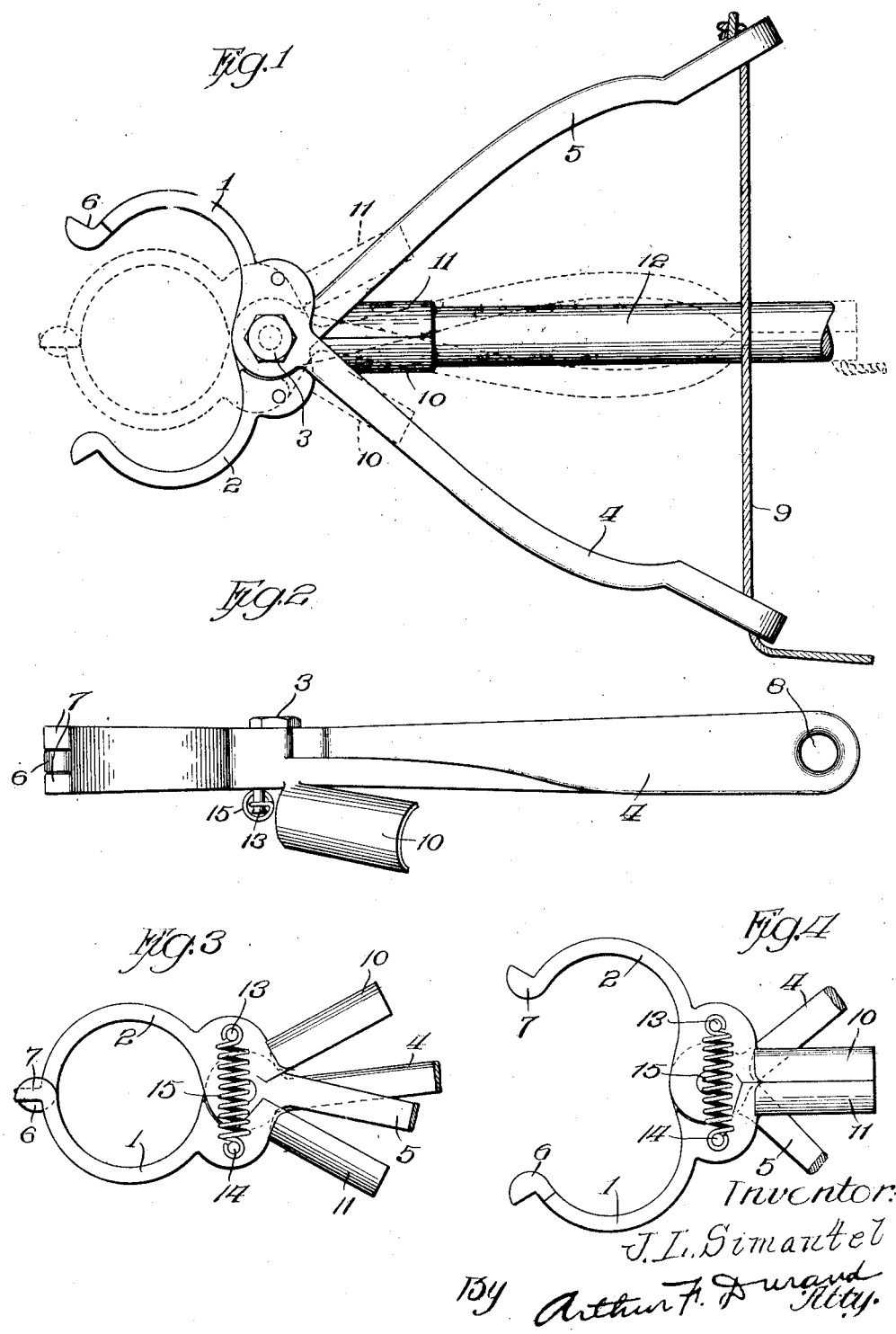

UNITED STATES PATENT OFFICE.

JOHN L. SIMANTEL, OF STERLING, ILLINOIS.

ANIMAL-CATCHER.

1,344,828.      Specification of Letters Patent.      Patented June 29, 1920.

Application filed May 22, 1919. Serial No. 298,962.

*To all whom it may concern:*

Be it known that I, JOHN L. SIMANTEL, a citizen of the United States of America, and a resident of Sterling, Illinois, have invented a certain new and useful Improvement in Animal-Catchers, of which the following is a specification.

This invention relates to devices for use in catching animals, such as those employed in catching hogs by the foot, and for similar purposes.

Generally stated, the object of the invention is to provide a novel and improved construction whereby a catching device of this character can be used with greater certainty and less liability of permitting the animal to escape, and with less possibility of injury to the person using the device.

It is also an object to provide certain details and features of construction tending to increase the general efficiency and the desirability of an animal catching device of this particular character.

To the foregoing and other useful ends the invention consists in matters hereinafter set forth and claimed, and shown in the accompanying drawings in which—

Figure 1 is a plan of an animal catching device embodying the principles of the invention, showing the same open to receive the foot of the animal.

Fig. 2 is a side elevation of the device shown in Fig. 1, showing the same in closed position, which is the position shown in dotted lines in Fig. 1, and showing the pole or handle removed.

Fig. 3 is a bottom plan of a portion of the device, showing the same closed.

Fig. 4 is a similar view showing the jaws open.

As thus illustrated, the invention comprises a pair of curved jaws 1 and 2 which are pivotally connected together at 3 and which are provided with rigid arms or lever-like handles 4 and 5 for the operation of said jaws. The end of the jaw 1 is provided with a reduced portion 6, and the end of the jaw 2 is provided with a notch 7 adapted to receive said portion, so that the ends of the jaws (the ends of the jaws being outturned and rounded on their opposing sides to facilitate entrance between the jaws, as shown) interlock when they are closed or brought together, thereby to reduce the strain on the pivot 3 while the animal is struggling to escape. The lever arm 4 has its end portion provided with an opening 8, and a cord 9 passes through this opening and has its end portion fastened to the end of the lever arm 5, so that a pull on this cord serves to bring the two lever arms together, thus closing the two jaws, as shown in dotted lines in Fig. 1. The two jaws are also provided with rigid curved sections 10 and 11 which, when brought together, form a socket for the pole or handle 12, the latter being of any suitable or desired length. Also, it will be seen that the two jaws are provided with pins 13 and 14, which are connected together by the spring 15, the positions of said pins being such that the said spring is at one side of the pivot 3, or the axis thereof, when the jaws are open (see Fig. 4), and is at the other side of said axis when the jaws are closed (see Fig. 3), whereby the spring will yieldingly retain the jaws in either their open or closed positions.

In use, the device is placed on the end of the pole or handle 12, and the pole is held in one hand while the cord 9 is held in the other hand. The person using the device then pushes the open jaws against the foot or leg of the animal, and a quick jerk on the cord will then close the jaws and catch the animal, thereby at the same time automatically releasing the pole or handle from the socket formed by the sections 10 and 11, as the latter will be swung apart by the closing of the jaws. The pull maintained on the cord 9 will keep the jaws closed, and because of the interlocking connection between the ends of the jaws formed by the portion 6 and the notch 7, the pressure exerted by the struggling animal will not be liable to open the jaws. The instant release of the pole or handle from the socket formed by the sections 10 and 11 prevents the animal from threshing the pole around, or kicking it backward, in a manner that might endanger the person using the device. Of course, at the time that the cord 9 is pulled to close the jaws, the operator is holding the pole in the other hand, and should the pole remain connected with the device, after the jaws are closed, either permanently or for a moment, it is obvious that the struggles of the animal might result in injury to the person holding the handle. A very slight pull on the cord 9, it will be seen, when the jaws are open, serves to move the spring 15 past the center or axis of the two jaws, so that the spring then quickly closes the jaws.

What I claim as my invention is:—

1. In an animal catcher, a pair of pivoted jaws, a handle by which to support said jaws, means for controlling said jaws with one hand while said handle is held in the other hand, and a spring applied to said jaws and disposed in position to yieldingly hold the jaws closed, and also to yieldingly hold the jaws open, so that in one case the spring tends to close the jaws and in the other case to open them.

2. A structure as specified in claim 1, said spring being of coil form and arranged so close to the axis of the jaws that only a slight closing movement of the jaws is necessary to shift the spring to the other side of said axis and into position to close the jaws.

3. In an animal catcher, a pair of pivoted jaws, a pole for supporting said jaws, a flexible connection arranged for closing said jaws, and mechanism to automatically disengage the pole when the jaws are closed.

4. A structure as specified in claim 3, said mechanism comprising a socket formed by relatively movable sections which are each rigidly connected with one of said jaws, so that said socket is opened by the closing of the jaws.

5. In an animal catcher, a pair of pivotally connected semicircular jaws, said jaws having their ends formed with outwardly projecting portions formed to interlock, thereby to reduce the strain on said pivotal connection when the animal struggles to escape, said portions being rounded on their opposing sides to facilitate entrance between the jaws, and means for operating said jaws with shoulders on the end of one jaw to limit the closing movement thereof.

6. A structure as specified in claim 5, the interlocking connection between the jaws comprising a notch in the end of one jaw and a reduced portion on the other jaw to enter said notch, so that the two jaws form a complete circle when interlocked, as set forth.

7. In an animal catcher, the combination of a pair of pivotally connected jaws, arms rigid with said jaws, a flexible connection attached to the end of one arm and having sliding engagement with the end of the other arm, a socket composed of relatively movable sections which are each rigid with one of said jaws, so that the socket is opened by the closing of the jaws, a pole for insertion in said socket, and a spring acting to yieldingly hold the jaws in closed position, and also in open position.

JOHN L. SIMANTEL.